(12) United States Patent
Kaneko et al.

(10) Patent No.: US 8,241,792 B2
(45) Date of Patent: Aug. 14, 2012

(54) ELECTRODE MATERIAL, METHOD OF MANUFACTURING THEREOF AND NONAQUEOUS LITHIUM SECONDARY BATTERY

(75) Inventors: Satoko Kaneko, Tokyo (JP); Masahiko Taniguchi, Tokyo (JP); Asao Iwata, Tokyo (JP); Ryuji Shiozaki, Tokyo (JP); Nobuo Ando, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/298,410

(22) PCT Filed: Nov. 9, 2007

(86) PCT No.: PCT/JP2007/071845
§ 371 (c)(1),
(2), (4) Date: Oct. 24, 2008

(87) PCT Pub. No.: WO2008/056794
PCT Pub. Date: May 15, 2008

(65) Prior Publication Data
US 2009/0104534 A1   Apr. 23, 2009

(30) Foreign Application Priority Data
Nov. 10, 2006 (JP) .................. 2006-306018

(51) Int. Cl.
*H01M 4/48* (2010.01)
*H01M 4/02* (2006.01)
*H01M 4/04* (2006.01)

(52) U.S. Cl. .............. 429/231.5; 423/594.17; 29/623.1; 252/182.1

(58) Field of Classification Search ............... 429/231.5; 423/594.17; 252/182.1
See application file for complete search history.

(56) References Cited

U.S. PATENT DOCUMENTS

| 5,376,478 A | 12/1994 | Nakacho et al. |
| 5,437,943 A | 8/1995 | Fujii et al. |
| 2004/0048157 A1* | 3/2004 | Neudecker et al. ........ 429/231.2 |
| 2004/0185346 A1* | 9/2004 | Takeuchi et al. .......... 429/231.9 |

FOREIGN PATENT DOCUMENTS

JP   02-223159 A   9/1990
(Continued)

OTHER PUBLICATIONS

S. H. Garofalini "Molecular dynamics simulations of Li transport between cathode crystals", Journal of Power Sources 110, pp. 412-415, 2002.*

*Primary Examiner* — Gregg Cantelmo
(74) *Attorney, Agent, or Firm* — McDermott Will & Emery LLP

(57) ABSTRACT

A crystal structure is provided to improve a characteristic of an electrode material, such as vanadium oxide. In the crystal structure, an amorphous state and a layered crystal state coexist at a predetermined ratio in a layered crystalline material such as vanadium oxide. In the layered crystalline material having such a layered crystal structure, layered crystal particles having a layer length L1 of 30 nm or shorter are formed. Ions are easily intercalated to and deintercalated from between the layers. When such a material is used for the positive electrode active material, a nonaqueous lithium secondary battery of which the discharge capacity and the cycle characteristic are good is manufactured.

10 Claims, 15 Drawing Sheets

LAYERED CRYSTAL STRUCTURE HAVING INTERLAYER MATERIAL

SHORT-PERIOD STRUCTURE → SECURE Li⁺ DIFFUSION PATHS

FOREIGN PATENT DOCUMENTS

| | | |
|---|---|---|
| JP | 05-105450 A | 4/1993 |
| JP | 05-198300 A | 8/1993 |
| JP | 06-132028 A | 5/1994 |
| JP | 06-168714 A | 6/1994 |
| JP | 08-083605 A | 3/1996 |
| JP | 08-083606 A | 3/1996 |
| JP | 11-086856 A | 3/1999 |

* cited by examiner

LAYERED CRYSTAL STRUCTURE
HAVING INTERLAYER MATERIAL

SHORT-PERIOD STRUCTURE → SECURE Li⁺ DIFFUSION PATHS

LONG-PERIOD STRUCTURE → LI⁺ DIFFUSION HINDRANCE FATOR

FIG. 8

|  | INITIAL CAPACITY (MAH/G) | CAPACITY RETENTION RATIO (%) AT 50 CYCLES |
|---|---|---|
| EXAMPLE 1 | 392 | 92 |
| EXAMPLE 2 | 385 | 88 |
| COMPARATIVE EXAMPLE 1 | 418 | 59 |
| COMPARATIVE EXAMPLE 2 | 419 | 57 |
| COMPARATIVE EXAMPLE 3 | 223 | 39 |

ELECTRODE MATERIAL, METHOD OF MANUFACTURING THEREOF AND NONAQUEOUS LITHIUM SECONDARY BATTERY

CROSS-REFERENCE TO PRIOR APPLICATION

This is the U.S. National Phase Application under 35 U.S.C. §371 of International Patent Application No. PCT/JP2007/071845 filed Nov. 9, 2007, which claims the benefit of Japanese Patent Application No. 2006-306018 filed Nov. 10, 2006, both of which are incorporated by reference herein. The International Application was published in Japanese on May 15, 2008 as WO2008/056794 A1 under PCT Article 21(2).

BACKGROUND OF THE INVENTION

1. Field of the Invention

The present invention relates to a battery technology and more particularly to a technology which is adaptable for a nonaqueous lithium secondary battery, a positive electrode material thereof, and the like.

2. Description of the Related Art

The inventors investigated the following technologies when the inventors created the present invention. The technologies are briefly described below.

A conventional nonaqueous lithium secondary battery uses lithium cobaltate, lithium manganate and lithium nickelate for the positive electrode thereof. The theoretical capacity of the battery per active material weight was 137 mAh/g, 148 mAh/g, and 198 mAh/g, and has never exceeded 200 mAh/g.

To cope with this capacity problem, study has been made to use a vanadium pentoxide material, having many valences and capability to give a high capacity, for a positive electrode material of a lithium secondary battery. However, a lithium ion source is not contained in the positive electrode material, that is, lithium ions must be supplied in the negative electrode material. Accordingly, its application is limited to a primary battery or a secondary battery of a very low current amount.

When the crystalline vanadium pentoxide is used for the positive electrode material, a low valent vanadium is used in order to give a high capacity to the positive electrode. In the case, however, the following problem arises: The charging and discharging operation causes the crystal structure to collapse, and thereby the repetition of the charge/discharge cycle lowers the battery capacity gradually.

JP-A-5-105450 discloses an approach to make the vanadium pentoxide an amorphous for the purpose of preventing such a crystal structure from collapsing.

JP-A-5-198300 discloses a constitution using γ type $LiV_2O_5$ for the positive electrode active material which allows lithium ions to be easily intercalated and deintercalated. The publication describes that the γ type $LiV_2O_5$ is formed by baking vanadium pentoxide and a lithium salt.

After investigating the publications, the inventors have found that the positive electrode active material using the vanadium pentoxide has the following disadvantages.

In the inventions disclosed in the publications mentioned above, the improvement of the property of the vanadium pentoxide as the electrode active material is based the crystal structure of the vanadium pentoxide. However, the effect of the improvement is not still satisfactory.

SUMMARY OF THE INVENTION

The inventors have analyzed the crystal structure of the vanadium oxide from a point of view different from those of the publications mentioned above with hope of obtaining further property improvement.

Accordingly, an object of the present invention is to improve the property of the vanadium pentoxide as an electrode active material more effectively by using a novel crystal structure of the vanadium oxide.

The above object and the other objects, and novel features of the present invention will be apparent when carefully reading the detailed description in connection with the accompanying drawings.

The invention of the present patent application is summarized as follows:

A layered crystalline material used as a positive electrode active material of a battery according to the present invention is designed such that at least the layer length of the layered crystal structure is controlled to be 30 nm or less, and the layered crystals are irregularly patterned. In such material, intercalation of ions into and deintercalation from between the layers are improved.

In the layered crystalline material, it is confirmed that in a microscopic observation in order of nm or less, only the crystal structure in which the layer length is 30 nm or less is present, or the layered crystal structure having a layer length of 30 nm or less and the amorphous structure coexist, and in a macroscopic observation obtained by such as X-ray diffraction analysis in order of μm, larger than nm, a macroscopic amorphous structure is observed in which the crystal structures are randomly arranged.

The typical effects of the present invention disclosed are described below.

In the present invention, at least the layer length of the layered crystal, used for the active material, is set to be a predetermined length or shorter. This characteristic feature ensures smooth intercalation of ions to and deintercalation from between the layers of the layered crystals.

The layer length of the layered crystal of the vanadium oxide, which is used as the positive electrode active material, is also set to be a predetermined length or shorter. Accordingly, lithium ions smoothly intercalate in and deintercalate from between the layers to thereby improve the battery capacity, the cycle characteristics, and the like.

BRIEF DESCRIPTION OF THE DRAWINGS

FIG. 8 is a table showing the characteristic evaluations of layered crystalline materials, of examples, having the layered crystal structure of the short layer length, which are according to the present invention, and layered crystalline materials, of comparative examples, having the layered crystal structure of the long layer length when those materials are each used for the positive electrode material;

DESCRIPTION OF THE PREFERRED EMBODIMENTS

Preferred embodiments of the present invention will be described in detail with reference to the accompanying drawings.

The present invention relates to a technology on an electrode material. More particularly, the present invention relates to a crystal structure of an active material, which can be used as a positive electrode material for use in a nonaqueous lithium secondary battery. Particularly, the present invention is well adaptable for a layered crystalline material such as a vanadium oxide.

In the vanadium oxide, e.g., $V_2O_5$, pentahedron units each consisting of one $VO_5$ expand in the two-dimensional direction, while being covalently bonded to thereby form one layer. The vanadium oxide layers are laminated into a layered structure.

In the present invention, such a layered crystalline material is macroscopically made amorphous while keeping its layered crystal structure, whereby the layer length of the layered crystalline material is shortened (made fine). Specifically, the layered crystal state having the long layer length is divided into a layered crystal state having the short layer length.

It is impossible to form such a layered crystal state having the short layer length when the material is completely amorphous. By stopping the process of making the material amorphous state in progress, the layered crystal state having the short layer length is allowed to be present in the material, that is, the material is made partially amorphous to form the layered crystal state.

Figure 1:
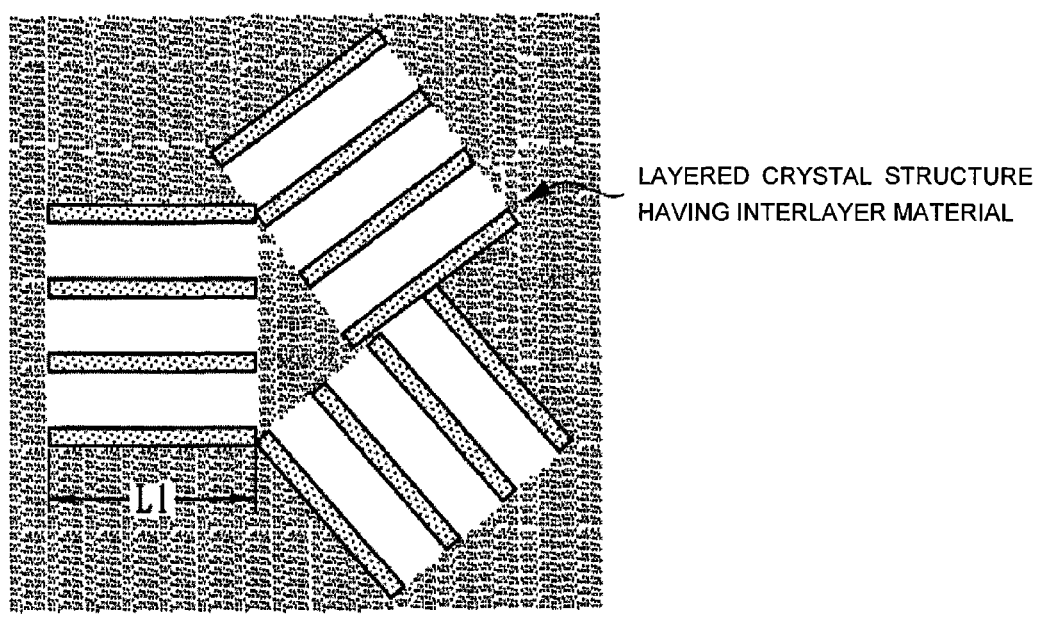
FIG. 1 is an explanatory diagram schematically showing a pattern of layered crystal structures each having a short layer length, which is based on the present invention.
Figure 2:
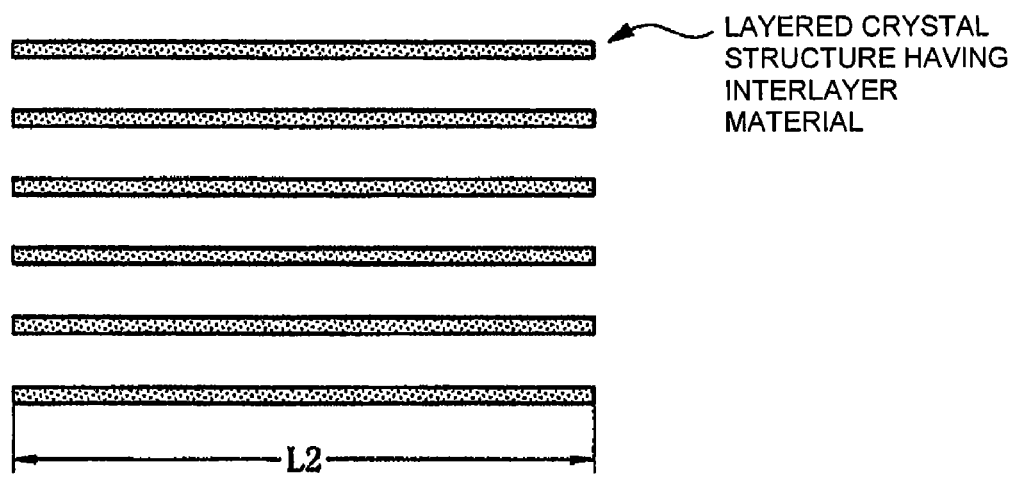
FIG. 2 is an explanatory diagram schematically showing a pattern of layered crystal structures having a long layer length, which is different from that of the present invention.

FIG. 1 schematically shows a pattern of a layered crystal state having a short layer length L1, according to the present invention. A so-called short-period structure in which the layer length L1 is repeated in averagely short periods forms a layered crystal structure, and amorphous crystals of $V_2O_5$ are filling between the layered crystals. FIG. 2 schematically shows a pattern of a layered crystal state of a so-called long-period structure in which the layer length L2 is repeated in averagely long periods. In the layered crystal state according to the present invention, a plurality of layered crystals each having the short-period structure are aggregated as shown in FIG. 1

When the layered crystalline state of the short layer length is used as, for example, an electrode active material of a battery, chemical species such as ions which come into play in chemical reaction or the like of the battery easily intercalate into and deintercalate from between the layers of the layered crystal state. The ions having been doped into between the layers are easy to diffuse since the layer length is short and the diffusion path is short. The charge/discharge characteristic or the cycle durability, etc. is superior to that of the layered crystal state having a long period structure in which the intercalation and the deintercalation of the ions are not smooth.

In the present invention, the layer length is important. The layer length affects the length of a path of ions moving in and out of between the layers directly. No problem arises even if a factor other than the layer length, for example, a thickness of the layer in the layered crystal structure, is decreased with decrease of the average crystal particle size. It is essential that the size of the average crystal particles having the layered crystal structure is small, and the ions easily intercalate in and deintercalate from between the layers.

Vanadium oxides can be cited as an active material with the layered crystal structure, which can be used for an electrode material, such as a positive electrode material, of a nonaqueous lithium secondary battery. The vanadium oxide is preferably vanadium pentoxide or lithium vanadate.

Such a metal oxide is macroscopically amorphized as described above. The metal oxide macroscopically amorphized is doped with lithium ions, for example. It is preferable to dope lithium ions into the metal oxide in a molar ratio of 0.1 to 6. When the doping amount of lithium ions is smaller than 0.1 in terms of molar ratio, sufficient doping effect is not secured. It is not preferable that the doping amount of lithium ions exceeds 6 in terms of molar ratio, since the metal oxide may be reduced to metal.

In the specification, the term "dope" involves "occlude", "support" "adsorb" or "intercalate", and specifically means a phenomenon in which lithium ions enter the electrode active material of, for example, the positive electrode.

When the vanadium oxide is synthesized, a monomer of a sulfur-containing organic conductive polymer is sometimes contained in the active material in the stage of manufacturing. The reason for this would be presumed that when a monomer of a sulfur-containing conductive polymer is present, this monomer acts as an oxygen inhibiting agent to fix an oxygen concentration in the reaction system and thereby to control the structure of the lithium ion-doped amorphous metal oxide produced.

That is, vanadium is easily oxidized and reduced in a solution under the influence of air. Controlling this redox (reduction-oxidation) status is considered to be important in terms of the property of the electrode active material. An amount of oxygen, which comes into the solution from air, can be controlled constant due to the presence of the monomer, and as a result, the redox status of vanadium can be kept constant. It is considered that a crystal state showing high capacity can be formed preferably by such control of the redox status.

The performance of the sulfur-containing conductive polymer as the active material at the end of the reaction is low. However, the performance of the active material could be improved by removing the sulfur-containing conductive polymer from the final product by concentration process under reduced pressure, and the like.

When the sulfur-containing organic conductive polymer is put into the active material, the ratio of the sulfur-containing organic conductive polymer contained in the active material is 1 to 30% of the weight of the metal oxide in the stage of manufacturing.

The active material mentioned above can be synthesized in a manner that the metal oxide as the layered crystalline material, together with the monomer of the sulfur-containing organic conductive polymer, is heated in the presence of a water-soluble lithium source in water. For example, the active material can easily be synthesized by heating the metal oxide under reflux. The sulfur component can easily removed by subjecting the suspension refluxed to the process of concentration under reduced pressure.

Lithium ions are doped into the active material described above, in which the ions easily intercalate in and deintercalate from between the layers of the layered crystalline material. Examples of the lithium ion source include lithium sulfide, lithium hydroxide, lithium selenide and lithium telluride. At least one kind of lithium compound, which is selected from the group of such lithium compounds, is used as the water-soluble lithium source. The lithium sulfide or the lithium hydroxide is preferable in light of low toxicity and low price.

The water soluble lithium source dissolves in water to exhibit alkaline property. The metal oxide such as vanadium oxide usually available in a crystalline (layered) compound is dissolved into the resulting alkaline aqueous solution to be amorphized. The amorphous metal oxide captures lithium ions.

The vanadium oxide is dissolved into hydrogen peroxide. Even when hydrogen peroxide is used, the vanadium oxide is in an amorphous state when macroscopically viewed, but when microscopically viewed, coexisting state of an amorphous state and a short-layer-length layered crystal state can coexist in the vanadium oxide. In this case, the aqueous solution exhibits acidic property. A metal oxide such as vanadium oxide, usually available as a crystalline (layered) compound, is dissolved into the resulting acid aqueous solution, and is amorphized so that a layered structure having a predetermined layer length is formed.

The thus obtained active material, together with a binder of, for example, polyvinylidene fluoride (PVDF) and preferably a conductive particle, are mixed to form a positive electrode material. The positive electrode material thus formed is coated over a conductive substrate to manufacture a positive electrode. The layer of the positive electrode material for the nonaqueous lithium secondary battery is formed to be 10 to 100 µm in thickness, for example.

The conductive particle may be made of a conductive carbon (conductive carbon such as Ketjen Black), a metal such as copper, iron, silver, nickel, palladium, gold, platinum, indium, and tungsten, or a conductive metal oxide such as indium oxide and tin oxide. It suffices that the ratio of the conductive particles contained is 1 to 30% of the weight of the metal oxide.

A conductive substrate, which has an electrical conductivity on at least the surface thereof in contact with the positive electrode material can be used for the substrate (current collector) supporting the positive electrode material. Such a substrate can be made of a conductive material such as metal, conductive metal oxide, and conductive carbon. Particularly, copper, gold, aluminum, an alloy of them or conductive carbon are preferably used for the substrate. If the substrate is made of a non-conductive material, the substrate needs to be coated with a conductive material.

Figure 3:
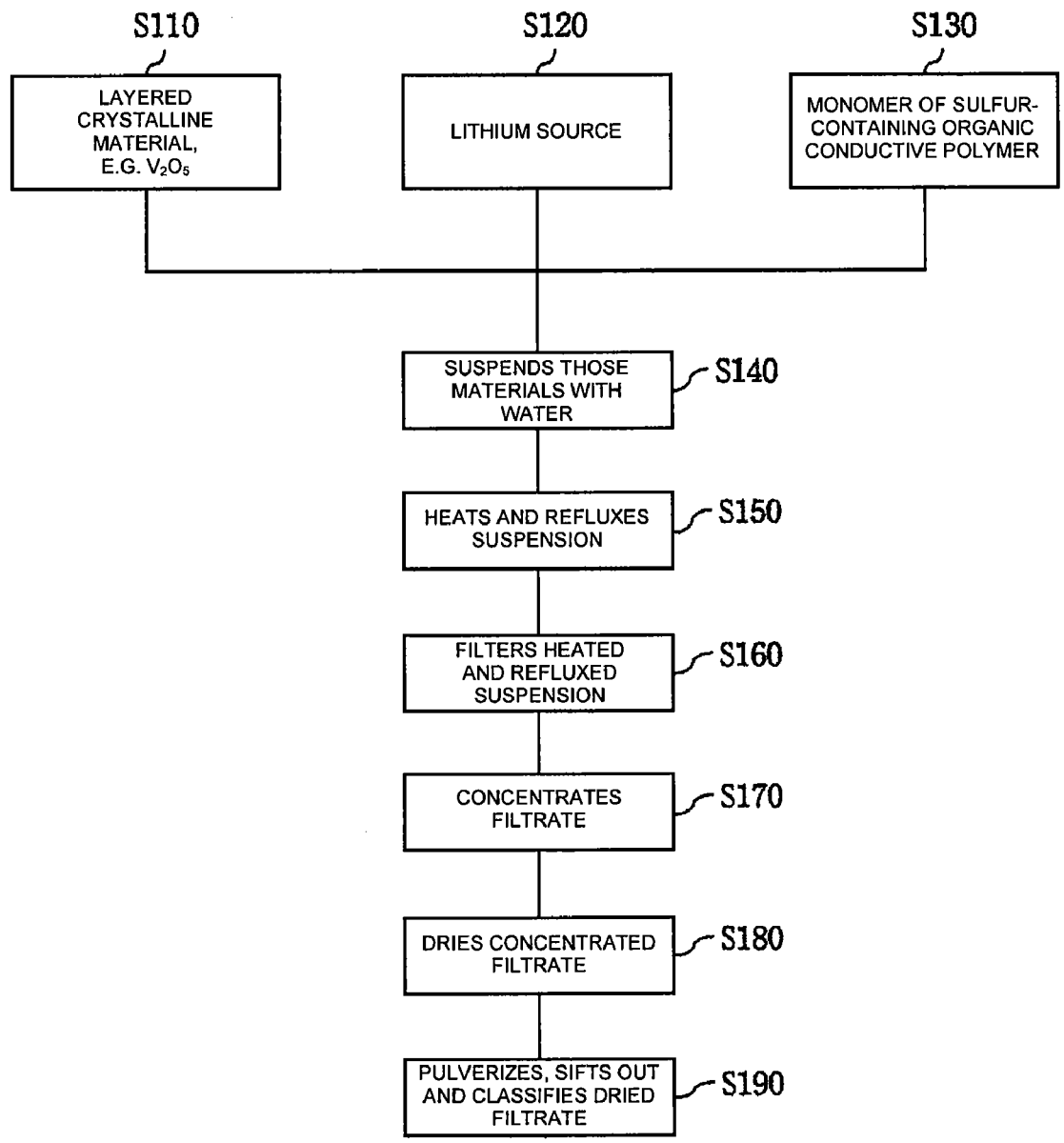
FIG. 3 is a flow chart showing a process of manufacturing a layered crystalline structure having the short layer length, which is according to the present invention.

A layered crystalline material having the short layer length, which is effective for the positive electrode material of the nonaqueous lithium secondary battery, is manufactured by a manufacturing process flow charted as shown in FIG. 3.

As shown in FIG. 3, in step S110, vanadium pentoxide, for example, is prepared as a layered crystalline material. In step S120, a water-soluble lithium ion source is prepared and in step S130, a monomer of a sulfur-containing organic conductive polymer is prepared.

The vanadium pentoxide, the water-soluble lithium ion source, and the monomer of the sulfur-containing organic conductive polymer, which are prepared in steps S110, S120 and S130, are suspended in water in step 140. An amorphization starts by the suspension. The water-soluble lithium ion source can be lithium sulfide or lithium hydroxide, for example. The monomer of the sulfur-containing organic conductive polymer can be 3,4-ethylene dioxythiophene, for example.

The suspension is heated under reflux for a predetermined time in step S150. Following the heating under reflux of the suspension in step S150, the solid content is filtered out from the heated and refluxed suspension in step S160. The filtrate from which the solid content has been removed is concentrated in step S170. After concentrated, the filtrate is dried by vacuum drying process, for example, in step S180. The resultant is pulverized into particles having predetermined particle sizes by, for example, a ball mill, and the particles are sifted out and classified. In this way, powder of the vanadium pentoxide having the layered crystal structure of the short layer length is obtained. The layered crystal structure powder is used for the active material of the positive electrode.

In the heating process in each of steps S150 and S180, the heating temperature must be set at lower than 250° C. It is not preferable that the temperature exceeds 250° C., since the layered crystal having the short layer length, which is the feature of the present invention, changes from its original state. It is preferable to perform the concentration process in step S170 at a pressure of lower than 21.00 kPa in order to remove the extra sulfur component from the active material.

Figure 4:
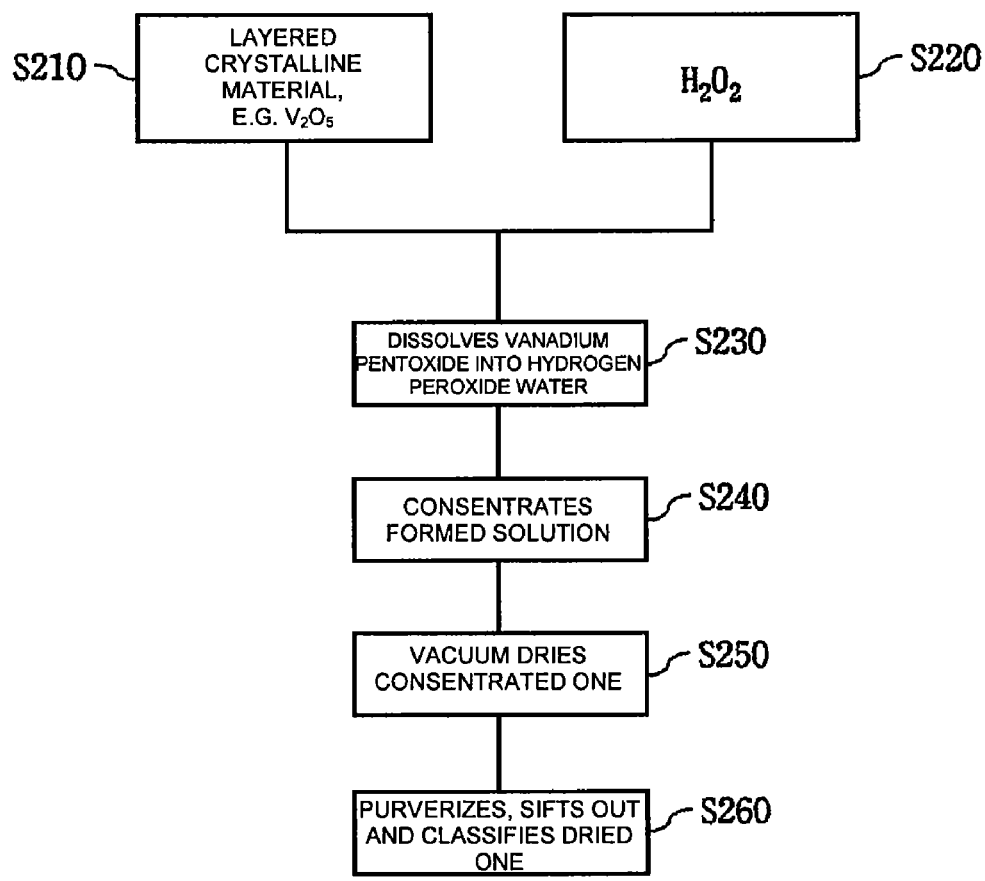
FIG. 4 is a flow chart showing another process of manufacturing a layered crystalline structure having the short layer length, which is according to the present invention.

The layered crystalline material according to the present invention can also be manufactured by a manufacturing process flow charted as shown in FIG. 4.

In step S210, vanadium pentoxide as a layered crystalline material is prepared as shown in FIG. 4. A hydrogen peroxide solution is prepared in step S220. In step S230, the vanadium pentoxide prepared in step S210 is dissolved into the hydrogen peroxide solution prepared in step S220. Subsequently, the solution formed in step S230 is concentrated and solidified in step S240. The concentrated material is vacuum-dried in step S250, and pulverized into particles having predetermined particle sizes by, for example, a ball mill, and sifted out and classified in step S260.

When the concentrating temperature rises in the concentration process of step S240 in the manufacturing process, the growing rate of the layer increases to fail to obtain a desired layered structure. To avoid this, it is preferable that the concentrating temperature is set at lower than 100° C. For the same reason as described above, it is preferable that the vacuum drying temperature in step S250 is set at lower than 250° C.

In the flow chart of FIG. 3, the filtrate is dried in step S180. In the flow chart of FIG. 4, the solution is concentrated at lower than 100° C. in step S240, and the resultant material is dried at lower than 250° C. in step S250. Thereby, the progress of the amorphization can be adjusted to control the layer lengths of the fine crystal particles within a predetermined range. In this way, a partially amorphized layer crystalline material can be obtained.

In the layered crystalline material of the present invention, the initial discharge capacity and the capacity retention ratio at the time of 50 cycles, which are good, are provided when the layered crystals of the crystal structure having a layer lengths of 30 nm or shorter are contained 30% or larger in terms of area ratio in a cross section of the layered crystalline material when observed at least by transmission electron micrograph. In the layered crystal structure of which the layer length exceeds 30 nm or the amorphous structure which does not exhibit the layered crystal structure in a micro-region of 30 nm or shorter, the capacity retention ratio when the cell is cyclically charged and discharged is low.

More specifically, it suffices that the layered crystals of the crystal structure having a layer lengths of 30 nm or shorter are within a range from 30% to nearly 100% in terms of area ratio in a cross section of the layered crystalline material when observed by transmission electron micrograph.

When the area ratio of such layered crystals is 100%, the amorphous state is microscopically not present in the material and the material is only in the layered crystal state. Even if the area ratio of the layered crystals of the crystal structure having a layer lengths of 30 nm or shorter is 100%, the layered crystalline material so constructed will effectively produce the useful effects.

It is preferable that the shortest layer length of the layered crystal structure is 1 nm or longer. When the layer length of the layered crystal is shorter than 1 nm, lithium ions cannot be intercalated to and deintercalated from between the layers. In this state, it is impossible to obtain high capacity. When the layer length exceeds 30 nm, the crystal structure will collapse in charge and discharge process and the cycle characteristic becomes poor. Accordingly, the layer length preferably ranges from 1 nm to 30 nm, more preferably 5 nm to 25 nm.

Figure 5:
FIG. 5 is a TEM (transmission electron microscope) photograph of a positive electrode material manufactured by a manufacturing method according to one embodiment of the present invention.

FIG. 5 is a transmission electron microscope photograph of a layered crystal state having a layer lengths from 5 nm to 25 nm, which is concerned with the present invention. The photograph shown in FIG. 5 shows the layered crystal state of the vanadium pentoxide.

A nonaqueous lithium secondary battery is constructed using the active material mentioned above for the positive electrode. The nonaqueous lithium secondary battery is constructed with the positive electrode, a negative electrode and an electrolyte layer located between the positive electrode and the negative electrode.

The negative electrode can be made of a lithium material, usually used in nonaqueous lithium secondary batteries. Available examples of the lithium material include a lithium metal material, e.g., metal lithium or lithium alloy (e.g., Li—Al alloy), an intermetallic compound material of lithium metal and a metal such as tin or silicon, a lithium compound such as lithium nitride, and a lithium intercalation carbon material.

As the electrolyte usable is a lithium salt such as $CF_3SO_3Li$, $C_4F_9SO_8Li$, $(CF_3SO_2)_2NLi$, $(CF_3SO_2)_3CLi$, $LiBF_4$, $LiPF_6$ or $LiClO_4$. A solvent into which the electrolyte is dissolved is a nonaqueous solvent.

Available examples of the nonaqueous solvent include a chain carbonate, an cyclic carbonate, an cyclic ester, a nitrile compound, an anhydride, an amide compound, a phosphate compound, and an amine compound. Specific examples are ethylene carbonate (EC), diethyl carbonate (DEC), propylene carbonate, dimethoxyethane, γ-butyrolactone, n-methylpyrrolidone, N,N'-dimethylacetoamide, acetonitrile, a mixture of propylene carbonate and dimethoxyethane or a mixture of sulfolane and tetrahydrofuran.

The electrolyte layer, which is located between the positive electrode and the negative electrode, can be the solution formed by dissolving the electrolyte into the nonaqueous solvent. It also can be a polymer gel containing such an electrolyte solution (polymer gel electrolyte).

Figure 6:
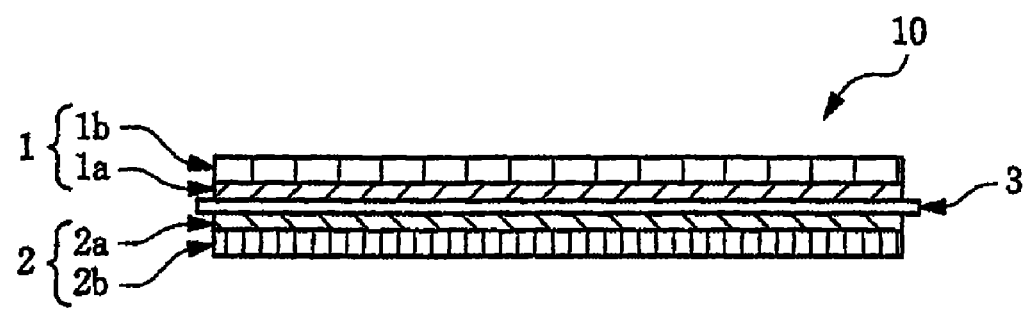
FIG. 6 is a cross sectional view showing a structure of a nonaqueous lithium secondary battery using a layered crystalline material having the layered crystalline structure of the short layer length as the positive electrode active material.

The nonaqueous lithium secondary battery is constructed as shown in FIG. 6. To be more specific, in a nonaqueous lithium secondary battery 10 a positive electrode 1 and a negative electrode 2 face with each other through an electrolyte layer 3 being interposed therebetween. The positive electrode 1 is formed with a positive electrode active material 1a containing the layered crystal structure having predetermined short layer lengths and a substrate 1b functioning as a current collector. The positive electrode active material 1a is layered on a surface of the substrate 1b, as shown in FIG. 6.

The negative electrode 2 includes a negative electrode active material 2a and a substrate 2b as a current collector. The negative electrode active material 2a is layered on a surface of the substrate 2b. The positive electrode 1 and the negative electrode 2 face each other through an electrolyte layer 3 being interposed therebetween.

EXAMPLES

The present invention will be described in more details by using some examples.

Example 1

In this example, 2.0 g of vanadium pentoxide ($V_2O_5$) as a layered crystalline material, 0.3 g of lithium sulfide ($Li_2S$) as a water-soluble lithium source, and 1.0 g of 3,4-ethylene dioxythiophene (EDOT) as a monomer of a sulfur-containing organic conductive polymer were suspended in 50 ml of water.

The suspension liquid was heated with stirring under reflux for 24 hours. After the stirring ends, it was sucked and filtered to remove the solid content therefrom. The removed solid content included sulfur and a polymer of 3,4-ethylene dioxythiophene. The filtrate from which the solid content had been removed was concentrated under reduced pressure in conditions of 75° C. and 10.67 kPa (80 Torr). Water, organic material and any extra sulfur component were removed from the resulting filtrate to thereby obtain a black solid. The thus obtained product was vacuum-dried at 100° C.

Figure 7:
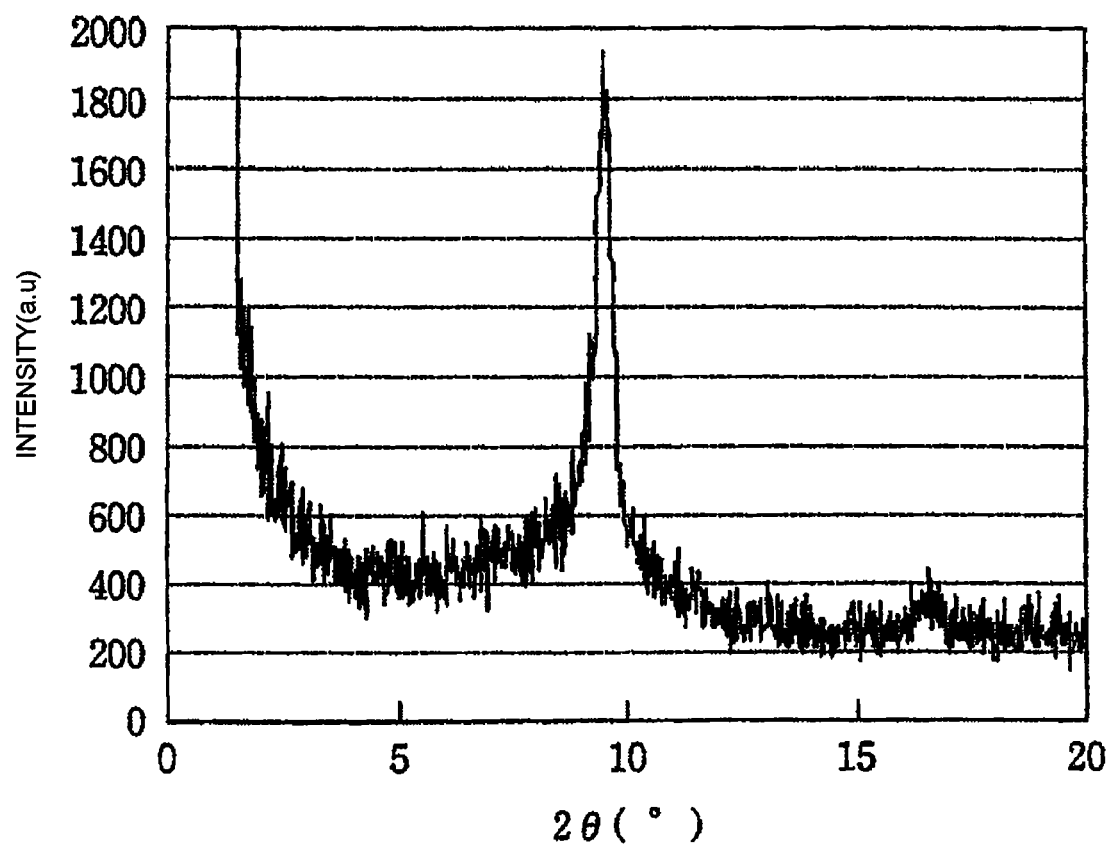
FIG. 7 is a graph showing the result of analyzing, by X-ray crystal diffraction, the layered crystal structure having the short layer length, described in an example of the present invention.

The material having been vacuum dried was analyzed by X-ray diffraction (XRD), and the results of the analysis are shown in FIG. 7. As seen from FIG. 7, an intensity peak was observed at a point near 2θ=10°. ICP analysis was performed for the material and the analysis result showed that lithium had been captured in the material. Elementary analysis showed that the amount of carbon was 1% or smaller.

The material was observed by transmission electron microscope (TEM). The result of the observation is shown in FIG. 5 (already referred to). It was confirmed from FIG. 5 that fine crystal particles of which layer lengths range from 5 nm to 25 nm were 99% in terms of area ratio. The material was pulverized into fine particles, which were sifted out and classified.

70 wt % of the material, 20 wt % of conductive carbon black, and 10 wt % of polyvinylidene fluoride were mixed and a slurry was formed by using N-methylpyrrolidone (MNP) as a solvent. The slurry was coated over an Al foil by a doctor blade method, and vacuum-dried at 150° C. to form a positive electrode.

A secondary battery was assembled. In the assembled battery cell, the positive electrode thus produced was used for the positive electrode. A solution of 1 mol $LiBF_4$/mixed solvent (ethylene carbonate (EC): diethyl carbonate (DEC)=1:3) was used for the electrolyte solution. Metal lithium was used for the negative electrode. The charge/discharge evaluation of the battery cell was performed at a 0.1 C discharge rate. The results of the discharge test are tabulated in FIG. 8. The initial capacity per active material weight was 392 mAh/g, and the capacity retention ratio was 92% at 50 cycles.

Example 2

In this example, 500 ml of 10% $H_2O_2$ was added to 5 g of vanadium pentoxide at room temperature. The produced vanadium pentoxide solution of red orange color was concentrated and solidified at 45° C. under reduced pressure. Then, the resultant was vacuum-dried at 150° C. to obtain a solid of 4.3 g. The solid had a red orange color.

Figure 9:
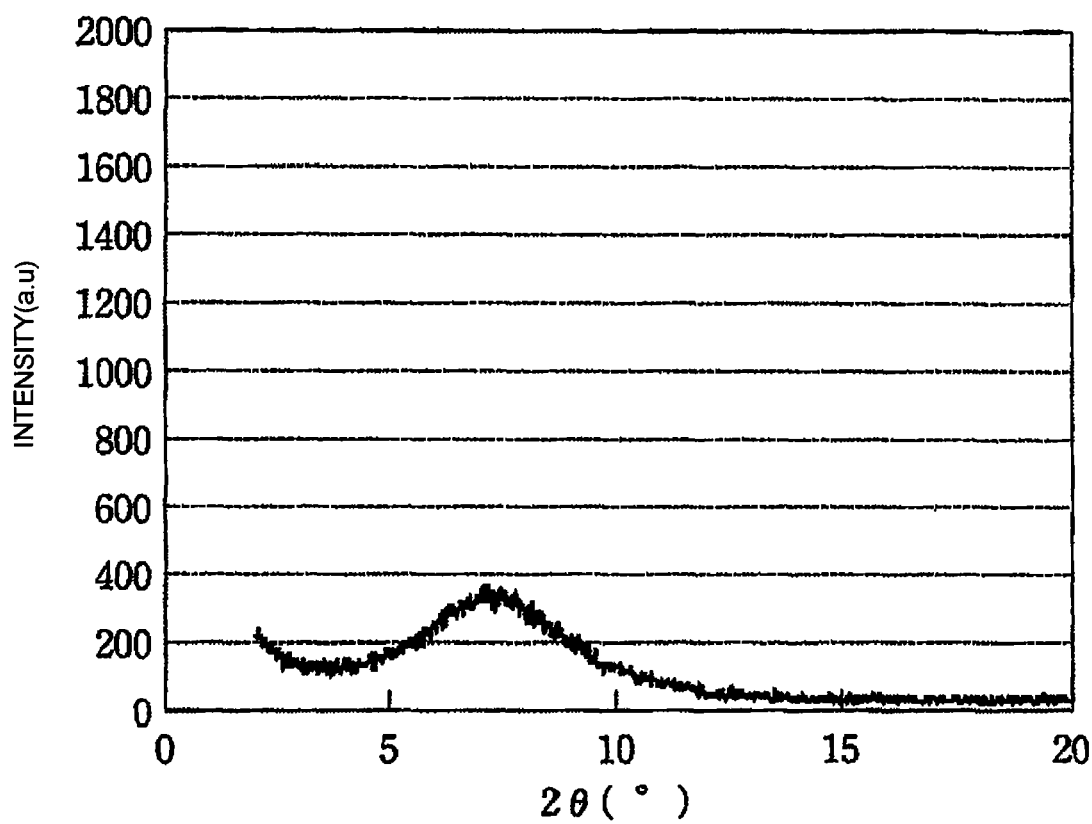
FIG. 9 is a graph showing the result of analyzing, by X-ray crystal diffraction, the layered crystal structure having the short layer length, described in an example of the present invention.
Figure 10:
FIG. 10 is a TEM photograph of a positive electrode material manufactured by a manufacturing method according to one embodiment of the present invention.

The material was analyzed by X-ray diffraction method, and the results of the analysis are shown in FIG. 9. As seen from the figure, a weak diffraction line diffracted at the (001) lattice plane was observed at a point near $2\theta=7°$. In the analysis by transmission electron microscope, it was confirmed from FIG. 10 that layered fine crystal particles of which layer lengths range from 5 nm to 10 nm were 99% in terms of area ratio. The material was pulverized into fine particles, which were sifted out and classified.

A positive electrode was manufactured using that material as in Example 1. The negative electrode and the electrolyte solution were also prepared as in Example 1. A non aqueous lithium secondary battery was assembled by using those electrodes and the solution, and the charge/discharge evaluation of the battery was performed as in Example 1. The results of the discharge test are tabulated in FIG. 8. The initial capacity per active material weight was 385 mAh/g, and the capacity retention ratio was 88% at 50 cycles.

Comparative Example 1

In Comparative Example 1, the suspension liquid was heated, stirred and refluxed as in Example 1, and was sucked and filtered to remove the solid content therefrom. The filtrate was pressure-reduced and concentrated in conditions of 75° C. and 10.67 kPa (80 Torr). Water and organic material were removed from the resulting filtrate. Then, the thus obtained product was vacuum-dried at 250° C.

Figure 11:
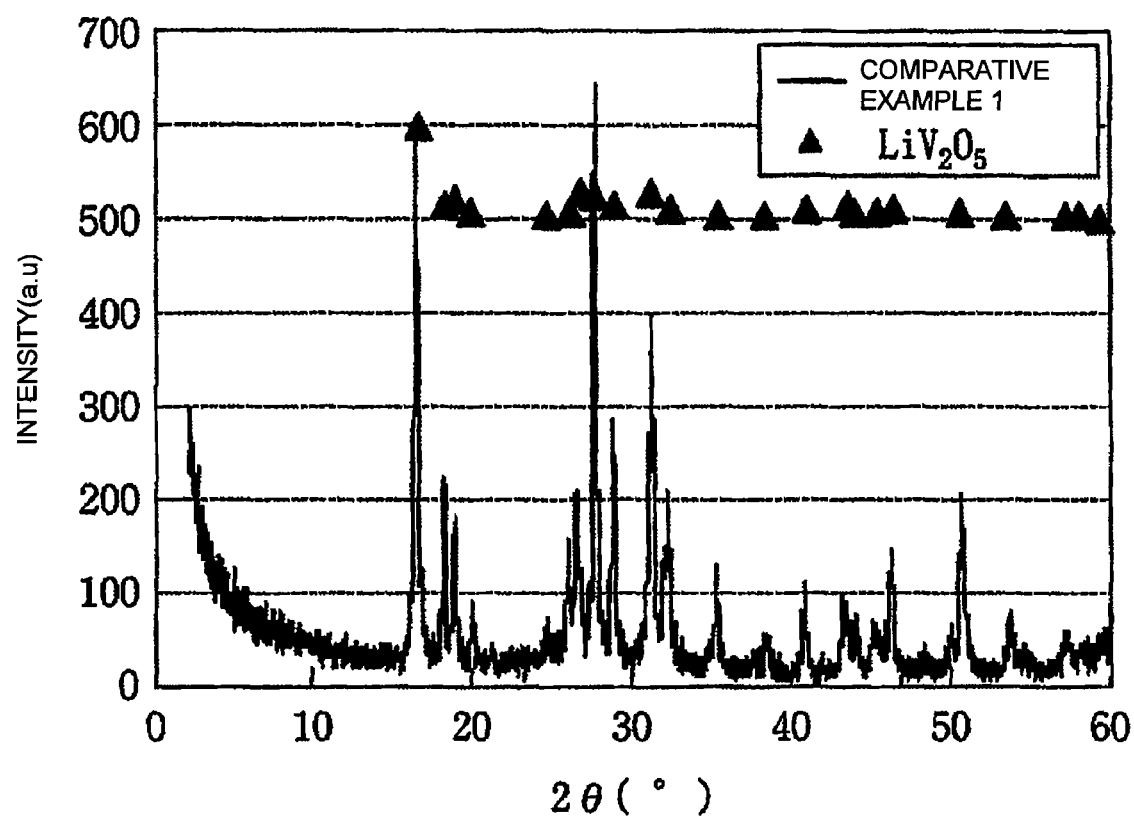
FIG. 11 is a graph showing the result of analyzing, by X-ray crystal diffraction, the layered crystal structure, which is different from that of the present invention, in a comparative example.
Figure 12:
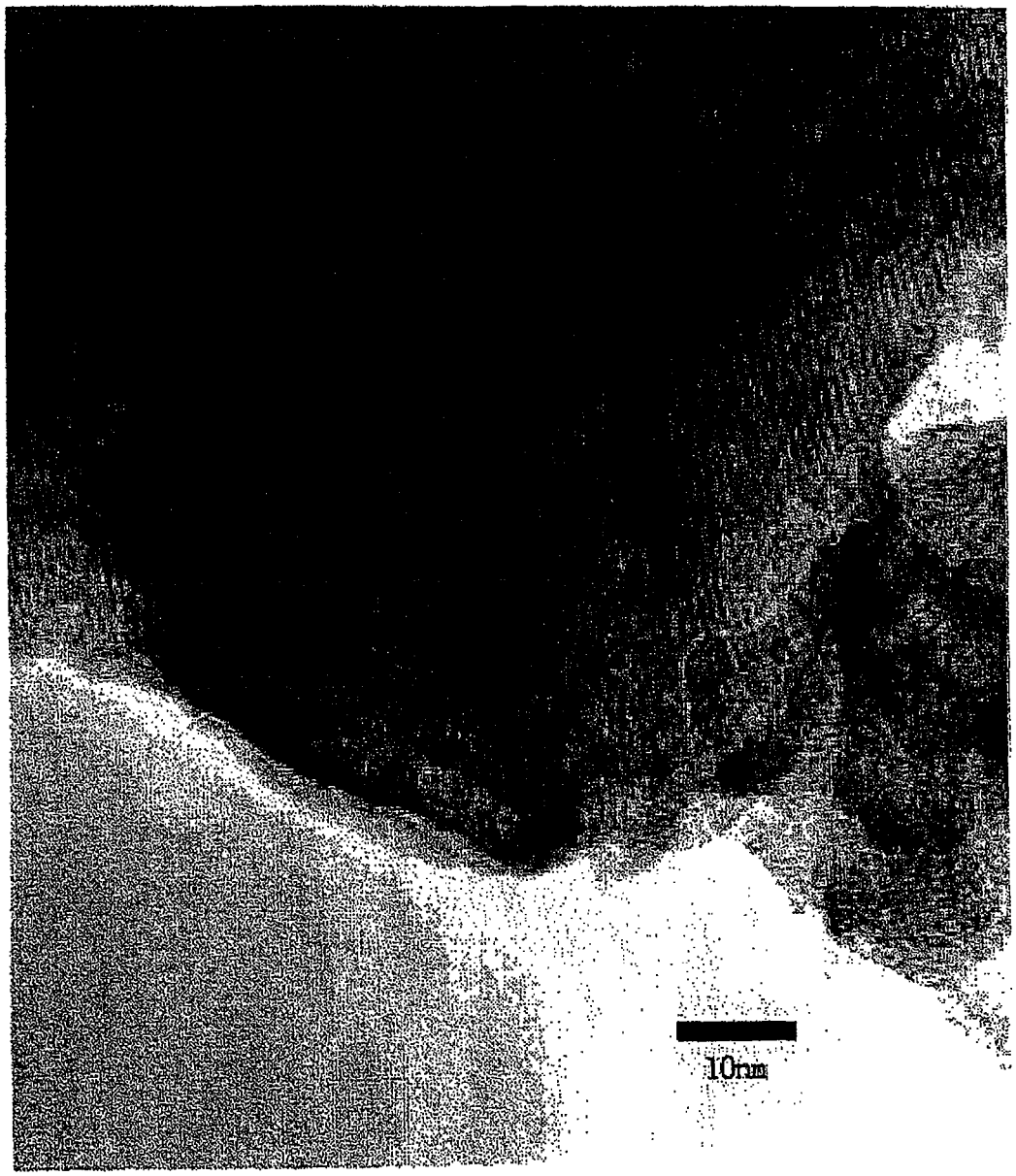
FIG. 12 is a TEM photograph of a layered crystal structure, which is different from that of the present invention, in the comparative example.

The black solid having been vacuum dried was analyzed by X-ray diffraction method. From the result of the analysis, the black solid was $LiV_2O_5$ as shown in FIG. 11. The material was observed by transmission electron microscope. The observation result showed that as shown in the photograph of FIG. 12, the material had a layered crystal structure of which the layer length exceeds 30 nm.

A positive electrode was manufactured using that material as in Example 1. The negative electrode and the electrolyte solution were also prepared as in Example 1. A non aqueous lithium secondary battery was assembled by using those electrodes and the solution, and the charge/discharge evaluation of the battery was performed as in Example 1. The results of the discharge test are tabulated in FIG. 8. The initial capacity per active material weight was 400 mAh/g, and the capacity retention ratio was 59% at 50 cycles. The cycle characteristic of the battery was inferior to those in Examples 1 and 2.

The following was confirmed. When the layered crystalline material was vacuum-dried and heated at 250° C. or higher, the crystal structure of the material, which was the layered crystal of the short layer length before it was vacuum dried, was transformed into the layered crystal structure of the long layer length. More specifically, before the vacuum-drying the amorphous state and the layered crystal state coexisted in the material. After the vacuum-drying, the amorphous state disappeared completely and only the layered crystal state existed.

From the results above, it was confirmed that the material having the layered crystal structure of the short layer length, which is according to the present invention, should not be heat-treated at 250° C. or higher in the stage of manufacturing.

Comparative Example 2

Figure 13:
FIG. 13 is a TEM photograph of a layered crystal structure, which is different from that of the present invention, in another comparative example.

In Comparative Example 2, the vanadium pentoxide as a raw material, not processed, was observed by transmission electron microscope. From the observation, it was confirmed that as shown in FIG. 13, the material has the layered crystal structure of which the layer length exceeds 30 nm. A positive electrode was manufactured by using the vanadium pentoxide as the positive electrode active material as in Example 1. The negative electrode and the electrolyte solution were also prepared as in Example 1. A nonaqueous lithium secondary battery was assembled by using those electrodes and the solution, and the charge/discharge evaluation of the battery was performed as in Example 1.

The results of the discharge test are tabulated in FIG. 8. The initial capacity per active material weight exceeds 400 mAh/g, but the capacity retention ratio was 57% at 50 cycles. The cycle characteristic of the battery was inferior to those in Examples 1 and 2.

Comparative Example 3

In Comparative Example 3, 500 ml of 10% $H_2O_2$ was added to 5 g of vanadium pentoxide at room temperature. The produced vanadium pentoxide solution of red orange color was concentrated and solidified at 100° C. under normal pressure. Then, the resultant was vacuum-dried at 150° C. to obtain a solid of 4.5 g. The solid had a red orange color.

Figure 14:
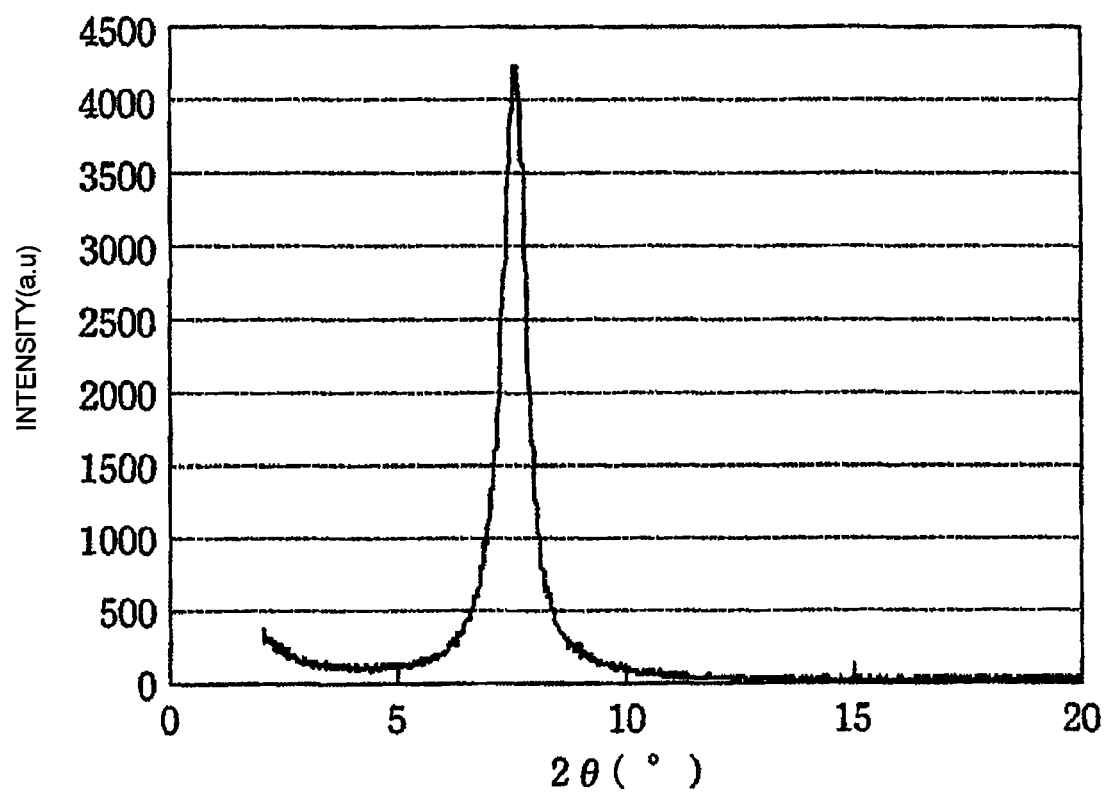
FIG. 14 is a graph showing the result of analyzing, by X-ray crystal diffraction, the layered crystal structure, which is different from that of the present invention, in yet another comparative example.
Figure 15:
FIG. 15 is a TEM photograph of a layered crystal structure, which is different from that of the present invention, in the yet another comparative example.

The material was analyzed by X-ray diffraction method, and the results of the analysis are shown in FIG. 14. As seen from the figure, a strong diffraction line diffracted at the (00n) lattice plane was observed. The observation result by transmission electron microscope showed that as shown in the photograph of FIG. 15, the material had a layered crystal structure of which the layer length exceeds 30 nm.

A positive electrode was manufactured using that material as in Example 1. The negative electrode and the electrolyte solution were also prepared as in Example 1. A nonaqueous lithium secondary battery was assembled by using those electrodes and the solution and the charge/discharge evaluation of the battery was performed as in Example 1.

The results of the discharge test are tabulated in FIG. 8. The initial capacity per active material weight was 223 mAh/g, and the capacity retention ratio was 39% at 50 cycles, lower than in Examples 1 and 2. The cycle characteristic of the battery was inferior to those in Examples 1 and 2.

As seen from Examples 1 and 2, and Comparative Examples 1, 2 and 3, when the vanadium pentoxide consists of an aggregation of the layered crystals of which at least the short layer length is 30 nm or shorter, and it is used as the positive electrode active material, the capacity characteristic is 380 mAh/g or larger and the capacity retention ratio at 50 cycles is 88% or higher, which is good when compared to that of the case of the layered crystal structure of which the layer length exceeds 30 nm.

While the present invention has been described using the embodiment and some specific examples, it should be understood that the present invention is not limited to those described ones, but can variously be modified, altered and changed within the true spirits of the present invention.

It is believed that the present invention will be useful in the fields including the positive electrode materials of the lithium secondary battery.

What is claimed is:

1. A method of manufacturing an electrode material using vanadium oxide as a positive electrode active material, the vanadium oxide containing a layered crystalline material, comprising the step of:
    partially amorphizing the layered crystalline material so that fine crystal particles having a layer length of 30 nm or shorter, exclusive of zero (0) nm, are contained in the layered crystalline material.

2. The method of manufacturing an electrode material according to claim 1, wherein the partially amorphizing step sets up such a state that an amorphous state and an layered crystal state, in which the layer length of the fine crystal particles is 30 nm or shorter, exclusive of zero (0) nm, coexist in the layered crystalline material.

3. The method of manufacturing an electrode material according to claim 1, wherein the partially amorphizing forms an area ratio of the fine crystal particles observed in a cross section of the layered crystalline material is 30% or more.

4. The method of manufacturing an electrode material according to claim 1, wherein the layered crystalline material is water soluble.

5. The method of manufacturing an electrode material according to claim 1 further comprising the step of heat-treating the layered crystalline material with a monomer of a sulfur-containing organic conductive polymer.

6. The method of manufacturing an electrode material according to claim 1 further comprising the step of mixing the layered crystalline material with at least one of lithium sulfide, lithium hydroxide and hydrogen peroxide.

7. The method of manufacturing an electrode material according to claim 1 further comprising the step of evaporating and drying an aqueous solution of the layered crystalline material.

8. The method of manufacturing an electrode material according to claim 1, wherein a manufacturing stage, comprises the step of heat-treating at lower than 250° C.

9. A nonaqueous lithium secondary battery comprising:
    a positive electrode comprises vanadium oxide having a layered crystalline material that is partially amorphized so to include fine crystal particles having a layer length of 30 nm or shorter, exclusive of zero (0) nm provided on a surface of a conductive substrate;
    a negative electrode; and
    a nonaqueous electrolyte located between the positive electrode and the negative electrode.

10. A method of manufacturing a nonaqueous lithium secondary battery, comprising:
    manufacturing an electrode material using vanadium oxide as a positive electrode active material, the vanadium oxide containing a layered crystalline material, the step of manufacturing the electrode material including
        partially amorphizing the layered crystalline material so that fine crystal particles having a layer length of 30 nm or shorter, exclusive of zero (0) nm, are contained in the layered crystalline material;
    providing a positive electrode including a layer of the electrode material provided on a surface of a conductive substrate of the positive electrode; and
    providing the positive electrode, a negative electrode, and a nonaqueous electrolyte provided between the positive electrode and the negative electrode.

* * * * *